United States Patent [19]
Barnstone et al.

[11] 3,781,533
[45] Dec. 25, 1973

[54] CONSTRAINT CONTROL SYSTEM FOR OPTIMIZING PERFORMANCE OF PROCESS UNITS

[75] Inventors: Leonard A. Barnstone, Morristown; Robert E. Levy, Whippany; Stanley M. Morris, Morristown; Alfredo M. Lopez, Morristown; Henry A. Mosler, Morristown; Robert J. Bartman, Mendham, all of N.J.

[73] Assignee: Esso Research and Engineering Company, Linden, N.J.

[22] Filed: Apr. 7, 1972

[21] Appl. No.: 241,959

[52] U.S. Cl...... 235/150.1, 208/DIG. 1, 235/151.12
[51] Int. Cl....................... G06f 15/46, G05d 21/02
[58] Field of Search....................... 235/151.12 MO; 208/DIG. 1

[56] References Cited
UNITED STATES PATENTS
3,686,488    8/1972    Woodle.......................... 235/151.12

Primary Examiner—Eugene G. Botz
Attorney—Leon Chasan et al.

[57] ABSTRACT

A control system which automatically optimizes the performance of a process unit by continuously scanning the important operating variables, measuring the deviation of these variables from a preselected target, identifying the instant limiting variable, calculating the change in a manipulated variable required to bring the most limiting variable to its target, adjusting the manipulated variable to make the calculated change, correcting operating conditions outside the control system to relieve the instant limit, and repeating the control process to identify a new limiting variable and to make changes needed to bring the new limiting variable to its target.

4 Claims, 3 Drawing Figures

CONSTRAINT CONTROL SYSTEM FOR OPTIMIZING PERFORMANCE OF PROCESS UNITS

BACKGROUND OF THE INVENTION

The operating ideal for most refining and chemical process units is a steady operation at the maximum possible throughput, but within product quality specifications. For many reasons, such an ideal is generally unachievable. Often, business conditions may require the objective to be not maximum production, but optimization of the overall operation by minimizing production costs at something less than maximum capacity.

The invention disclosed herein particularly relates to the control of refining and chemical process units, although it has broader application. A system is disclosed which enables operating personnel to optimize the performance of processing units by adjusting throughput, yields, or other preselected characterizing indices.

Typical process controls enable operating personnel to maintain uniform operating conditions automatically. When stable operations are established, their principal duties are to make fine adjustments to reach optimum conditions and to cope with any emergency or unusual conditions which may occur. Normal process control loops generally are designed to hold key variables, e.g. temperatures, pressures, flows, etc., at key variables, e.g. temperatures, pressures, flows, etc., at such values as may be selected by the operating personnel. The operators thus interact with a set of individual control loops in order to determine the mode of operation of the unit. While the concept of optimization is a simple one, in practice it is extremely difficult to achieve, inasmuch as it involves an adjustment of all operating variables so as to achieve the maximum overall profit. The price of utilities and operating labor, as well as the costs attendant to a failure to achieve specified product qualities must enter this complex effort. Everyday operations, with rotation of personnel, process upsets, equipment failures, and miscellaneous duties which require operator attention rarely achieve a truly optimum condition.

One approach which can be taken to optimize the operation of such process units is by the use of large computers to make calculations from data taken by the instrumentation to determine the optimum running condition at any given time. Such calculations require that complex mathematical models be prepared which simulate the unit's performance. As will be appreciated, such a system is extremely expensive and complex, although it may be justified in the case of very large scale operations. Such a system is, however, outside the scope of the operating personnel since as they cannot interact substantially with such a computerized operation.

The objective of the present invention is to provide a simpler system than that of the expensive computer installation described above, one which is not fully automated and permits an interaction between the operators and the instrumentation system. The interaction is required in order to optimize the performance of the unit or to maximize its throughput or yields.

SUMMARY OF THE INVENTION

In a typical process unit, an analysis is made of important variables in order to determine the limiting or target value of each (often a maximum or minimum permissible value). Such limitations will be referred to as constraints. The unit's optimum performance will usually be against one of the constraints, but not always the same one. The control system of the present invention monitors directly or calculates from indirect measurements all the preselected constraint variables, then selects the limiting variable, i.e. the one closest to its target value. By using a feedback controller, feed rate or some other key process variable is manipulated so that the unit operates against the limiting constraint. A typical control system may maximize production (or yields at fixed production) or minimize a particularly important utility consumption, such as the power required for a large compressor. An approach is made by the constraint control system to a rough optimum in an automatic way, while allowing for operator intervention to move beyond the rough optimum.

A constraint control system includes a set of equations and digital or analog computing elements for the continuous or repetitive solution of these equations. Such a system is superimposed on top of the conventional analog or digital control elements normally present on a process unit. The constraint control system continuously compares all potential constraint variables and selects the key or most limiting one. The physical measurements have different units so, to compare the constraints, the concept of "constraint sensitivity" is adopted. Constraint sensitivity is defined as the ratio of the change in a constraint variable to the change in the characterizing index which has been preselected for optimization, e.g. feed rate, steam consumption, etc. Use of constraint sensitivities permits comparison of all constraints on the same numerical bases. Once the limiting constraint has been identified, the proper adjustment of a preselected manipulated variable may be made which will bring the characterizing index to its limiting value.

Once the computer system has done its work and has maximized or optimized the performance of the process unit under the instant conditions, the operators may intervene in the process by making changes in the processing conditions so that the limiting constraint is no longer limiting. Once this happens, the control system will determine the next most limiting constraint variable and again make further adjustments in the operation in order to move the preselected characterizing index to a new maximum or optimum condition. The practical application of the system which is outlined in a general way in this summary will be more easily understood from the description of a preferred embodiment which follows.

DESCRIPTION OF THE PREFERRED EMBODIMENT

Figure 1:
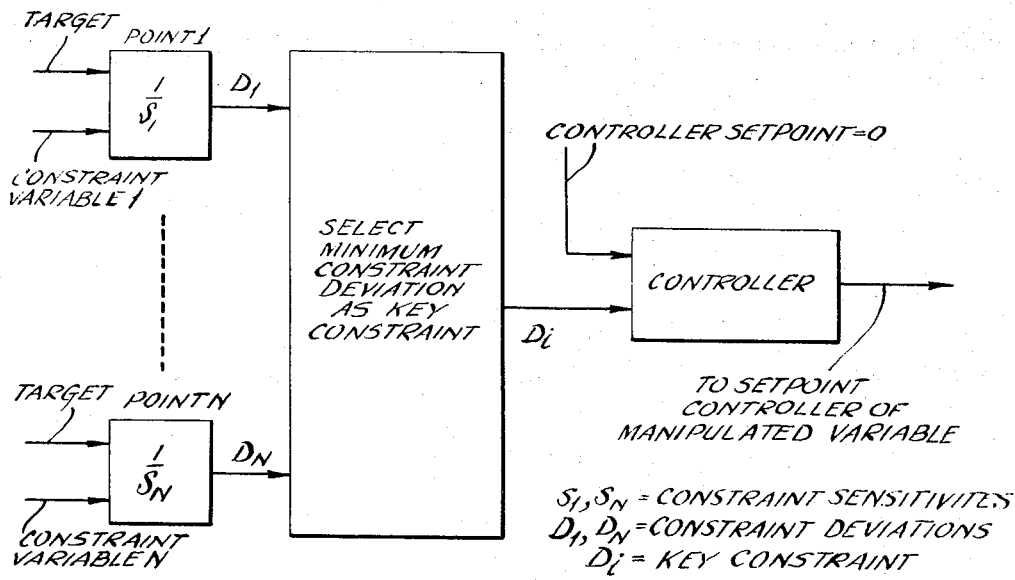
FIG. 1 — A block diagram of a constraint control system.

FIG. 1 is a block diagram of a typical constraint control system. It illustrates the selection and control process of the present invention. Each of the key variables which has been selected for observation and analysis is monitored by the control equipment. In FIG. 1 two such points are illustrated--point 1 and point N, which are members of a sequence of variables under observation. For each point a target value has been selected, which may be an optimum, but normally would be a limiting value, for example, a maximum allowable tube metal temperature or the fully open (or closed) position of a control valve. The maximum allowable metal temperature illustrates what may be called a "soft" constraint, whereas the fully open valve represents a "hard" constraint. The target value for is that value against which the actual measurement is compared. This comparison is made for each point in sequence (or simultaneously) and the deviation determined.

In order to compare the deviation from target value of a sequence of points, which will be necessarily measured in different units, for example, pressure, temperature, pressure drop, valve positions and the like, it is necessary to use a unit common to all variables. This may be done by calculating for each point what is termed a "constraint sensitivity." This is defined as the change in each variable which results from a unit of change in manipulated variable which has been selected as, or is related to, the characterizing index of the process unit's performance. Thus, when the deviation of a variable from its target value is divided by the "constraint sensitivity," the value obtained is the amount the manipulated variable can be changed without exceeding the target value of the particular variable which is under consideration. The term used for the permissible change in the manipulated variable is called the "constraint deviation." When the constraint deviation is calculated for which may be directly compared. The most restrictive constraint deviation determines the limiting constraint variable, usually, the smallest change in the manipulated variable is chosen.

The block diagram illustrates that the calculated constraint deviations are fed into a selecting device which determines which of the variables is the limiting one. The key where it is compared to the set point of that controller. The difference between the set point and the desired change then is determined and a control signal fed to the controller associated with the manipulated variable. The process is continually repeated as the constraint control system continually cycles, reading and determining the deviation of each variable from its target value, selecting the variable which is closest to its target, and making any change needed to the manipulated variable. Once the characterizing index has been brought to its optimum or maximum value by adjustment of the manipulated variable, this condition will continue until the limitation has been removed. The constraint control system holds the process unit against its limiting constraint (at its target value) until a change occurs which permits further adjustments to be made. The process of scanning variables and calculating deviations from target values may continue for an indefinite period with essentially no change being made to the process unit. It is at this point that the operators may interact with the control system by making adjustments which effectively remove the limitation, making it possible for the control system to take action again and adjust the manipulated variable so that the process unit is limited by a new variable. Of course, when certain adjustments by the operators are frequently made, those adjustments may be incorporated into the control system rather than rely on manual adjustments.

Figure 3:
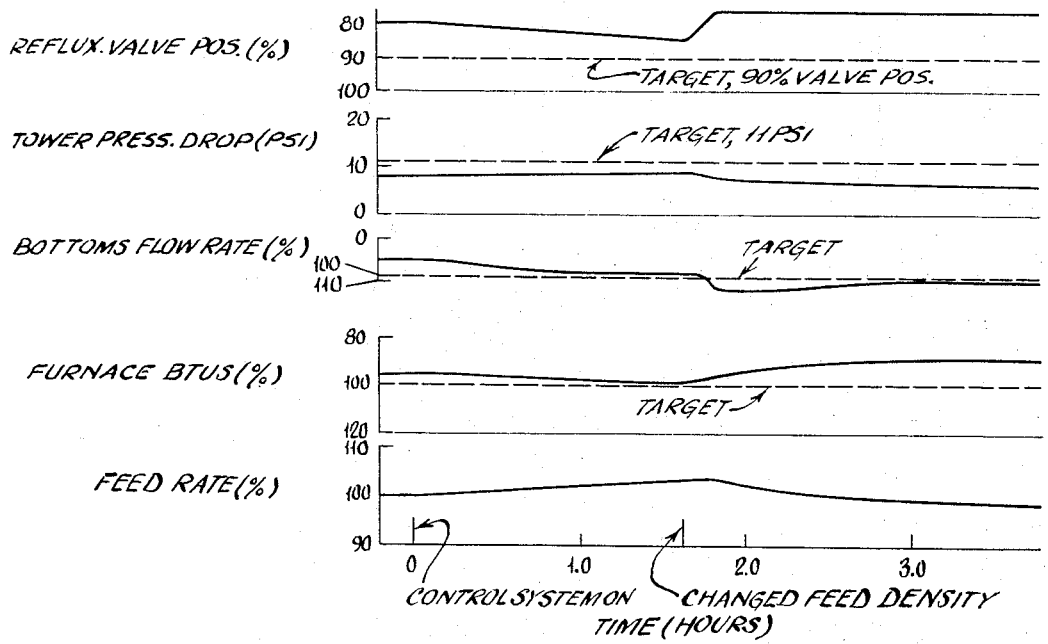
FIG. 3 — graphs showing typical results obtained by applying the constraint control system to the distillation operation of FIG. 2.
Figure 2:
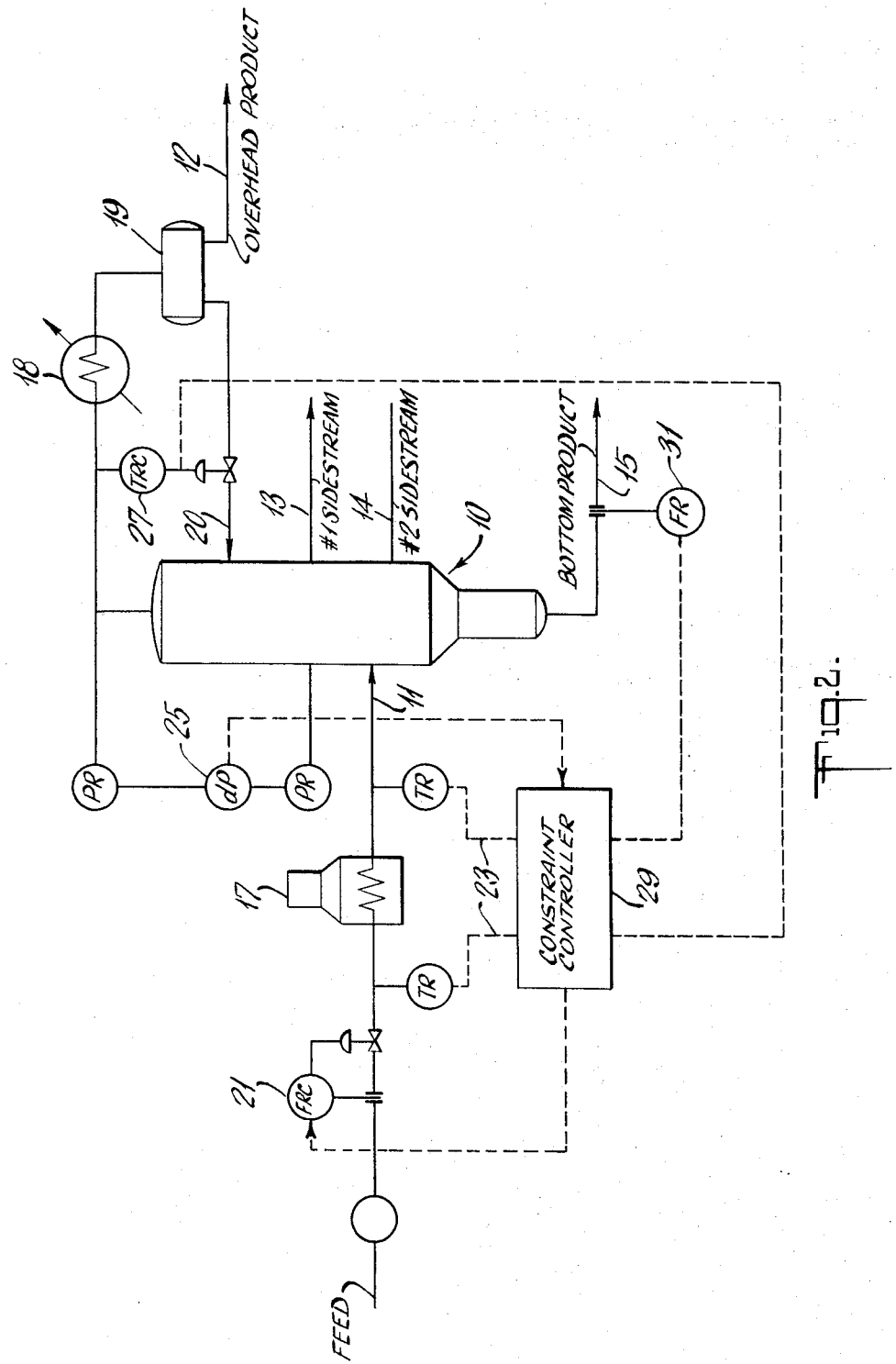
FIG. 2 — A simplified flow diagram of a typical distillation operation utilizing the constraint control system.

FIG. 2 is a simplified flow diagram of a typical distillation operation which, along with FIG. 3, illustrate the practical operation of the constraint control system which has been heretofore described in general terms. Inasmuch as this description is confined principally to the method of control, the diagram has been simplified for purposes of illustration. A distillation column 10 is fed by line 11 and produces overhead product via line 12, two side stream products via lines 13 and 14 and a bottom product via line 15. Feed to the column is heated in furnace 17. The vapor passing overhead from the column is condensed in condenser 18, collected in accumulator drum 19 and refluxed through line 20.

The feed rate as controlled by Flow Recorder/ Controller (FRC) 21 will be considered to be the characterizing index of the columns performance as well as the manipulated variable. (note that in a more complex case the manipulated but only having an indirect relationship to it.) FRC 21 would have a target value which would be the maximum permitted by the valve or pump capacities. The objective of this system will be to maximize feed rate to the distillation column although some other objective, such as minimizing furnace firing or maximizing one of the sidestreams could be used. Another key variable is the heat input to the column by furnace 17 which is calculated from the feed flow rate from FRC 21 and the inlet and outlet temperatures (TR23). The corresponding target value would be established by available burner capacity but could be set by localized temperature limits allowable within the furnace. Another key variable to be monitored is the pressure drop across the column which detects flooding of trays when excessive flow rates occur. Differential pressure across the column is measured by Delta-P instrument 25 (dP25). The target value will be set so that flooding is avoided. The overhead temperature from column 10 is measured by Temperature Recorder Controller (TRC) 27 which controls the reflux returning through line 20 to the top of the tower. This reflux target value will be set to correspond very closely to the fully open position of the valve. In the system of this example, the bottoms product rate is considered to be a limitation. The rate is measured by Flow Recorder 31 (FR 31) and that value transmitted to constraint controller 29 for comparison with its target value.

Constraint controller 29 receives information on the heat input of furnace 17, the pressure differential across tower 10, the reflux rate to the tower and the bottoms product rate. Each of these variables will be scanned in a sequence (or simultaneously), the instant values compared with the target values, the deviation from target values divided by the "constraint sensitivity" corresponding to that particular variable, the limiting variable selected, and a signal sent to FRC 21 to adjust the feed flow rate to the distillation column in order to bring the limiting variable to its target value. This may result in raising or lowering of the feed rate as will be seen in the test results shown in FIG. 3.

FIG. 3 shows typical results which are obtained by a computer simulation of the constraint control system of FIG. 2. In general, FIG. 3 illustrates the operation of a constraint control system having as its overall objective the maximizing of the feed flow rate as limited by the target value which is first reached—in this particular case, the bottoms flow rate. Once that target has been reached, an adjustment in feed density was made which increased the bottoms flow rate since more heavy material was present in the feed to the tower. This caused the bottoms flow rate to exceed the target value and the constraint control system, sensing this, made adjustments to the feed rate in order to bring the bottoms flow rate back to its target value. It will be seen that the values of the other constraint variables were not at their target values but were varying as the result of the changes which were being made to the feed flow rate. FIG. 3 shows that in the simple system operated to select the constraint variable closest to its target value, determined the degree of change to the feed flow rate required to bring the limiting variable to its target value, and then, when a change in the operation occurred, took corrective action to return the limiting variable to its target value. Thus, the constraint control will correct an upset as well as maximize or optimize the operation.

If, at the point at which the bottoms flow rate had reached its target value no change had occurred, the operation would have continued but no further adjustment to the feed rate would have been made. However, if the operators were able to take some action in order to reduce the quantity of bottom flow rate, such as increasing second sidestream drawoff, a deviation from the target could be established which would permit further increases in feed rate until the target value was reached again. It is this respect that a step-by-step operation of the constraint control system interacting with the operators corrective actions may be used in order to continually its maximum or optimum value.

To illustrate the interaction between the control system and the operators, consider the situation in which the process was limited by the reflux valve position. If the valve were wide open, the constraint control system would permit no further increase in feed rate. The operators could open a bypass around the reflux valve, which will tend to close the valve and thus move it away from its limiting position. The constraint control system would snese that the reflux valve position was no longer limiting and would increase the feed rate until the reflux valve position was again wide open or some other variable became limiting. This is a simple example and ignores other practical considerations which may be involved in determining the amount of reflux which could be used; but it illustrates the changes which the operators may make outside the constraint control system which make it possible for the constraint control system to further maximize or optimize the operation.

It will be understood that the distillation control system which is illustrated is a simplified illustration of the much more complex system which would ordinarily be applied to even a simple distillation column. The principles of operation, however, would be the same. It should be appreciated that in a simple system such as herein described it would be possible for the operators to make essentially these same changes by constant attention and continual adjustment of the feed flow rate in order to obtain the desired results. However, as the system is expanded to the more normal situation where many variables are to be considered simultaneously, it becomes a practical impossibility for such actions to be taken, inasmuch as the sufficient operating manpower is not available in order to apply such techniques. The system as herein described, which is simple and does not rely on extensive investigations of unit performance characteristics, may be applied to a wide variety of units to optimize or maximize their performance.

The invention as herein described may take many forms other than those which have been disclosed, the scope of the invention being covered by the claims which follow:

What is claimed is:

1. A method for controlling a process operating under supervision of a multiplicity of feedback control loops comprising in combination:
    a. monitoring the instant operation of each of a group of preselected variables;
    b. determining the deviation of each said variable from its predetermined target value;
    c. selecting the limiting one of the deviations determined in (b), said limiting deviation being the one which permits the most restrictive change in a preselected manipulated variable;
    d. adjusting a preselected manipulated variable to cause said limiting deviation to become equal to zero.

2. A method for controlling a process operating under supervision of a multiplicity of feedback control loops comprising in combination the steps of:
    a. selecting variables to be monitored;
    b. establishing target values for said monitored variables;
    c. determining the constraint sensitivity of each of said variables to a preselected manipulated variable;
    d. monitoring said variables;
    e. determining the instant deviation of each of said variables from its respective target value;
    f. dividing the instant deviation of each of said variables by its constraint sensitivity determined in (c), thereby obtaining the constraint deviation of each variable.
    g. comparing the instant constraint deviations of said variables and selecting as a key constraint deviation that which permits the most restrictive change in a preselected manipulated variable.

3. The method of claim 2, further comprising the steps of:
    h. determining the difference between said most restrictive constraint deviation and zero;
    i. adjusting said preselected manipulated variable by means of an associated feedback controller loop;
    j. repeating steps (d) through (i) until the most restrictive constraint deviation reaches zero, whereupon said process has reached a constrained condition.

4. The process of claim 2 wherein the most restrictive change of a preselected manipulated variable is one having the least numerical value.

* * * * *